United States Patent [19]

Behle

[11] 4,327,768
[45] May 4, 1982

[54] BOTTOM OUTLET VALVE OPEN AND CLOSED INDICATOR

[75] Inventor: Gunter R. Behle, St. Peters, Mo.

[73] Assignee: ACF Industries, Incorporated, New York, N.Y.

[21] Appl. No.: 205,203

[22] Filed: Nov. 10, 1980

[51] Int. Cl.³ .............................................. F16K 37/00
[52] U.S. Cl. .................................... 137/553; 251/144
[58] Field of Search ............... 251/144; 137/553, 556, 137/556.3, 556.6

[56] References Cited

U.S. PATENT DOCUMENTS 3,367,365  2/1968  Stevens ............................. 137/553
4,198,032  4/1980  Hillstead et al. ............... 251/268 X Primary Examiner—William R. Cline
Attorney, Agent, or Firm—Henry W. Cummings

[57] ABSTRACT

In accordance with the present invention an open and closed position indicator assembly is provided for use with a bottom operable tank car valve assembly. An operating shaft for the lading valve extends downwardly through the outlet chamber and includes a connection portion at its lower end. An indicator housing is integrally connected to that portion of the outlet chamber above the connection portion which surrounds the operating shaft. An indicator member located within the indicator housing is internally threaded and engages an externally threaded portion of the outlet chamber. The indicator member includes a lower non-round opening which is adopted to be driven by a cooperating non-round portion of the operating shaft. Rotation of the operating shaft with an operating handle will move the lading valve between open and closed positions and will also move the indicator member downwardly to a position below the indicator housing to a position viewable by the operator when the lading valve is in the open position, and will move the indicator member upwardly to a position within the indicator housing which is not viewable by the operator when the valve is in the closed position. In addition the extent to which the indicator member extends below the indicator housing may be used as a measure of the extent to which the lading valve is moved toward the open position.

12 Claims, 3 Drawing Figures

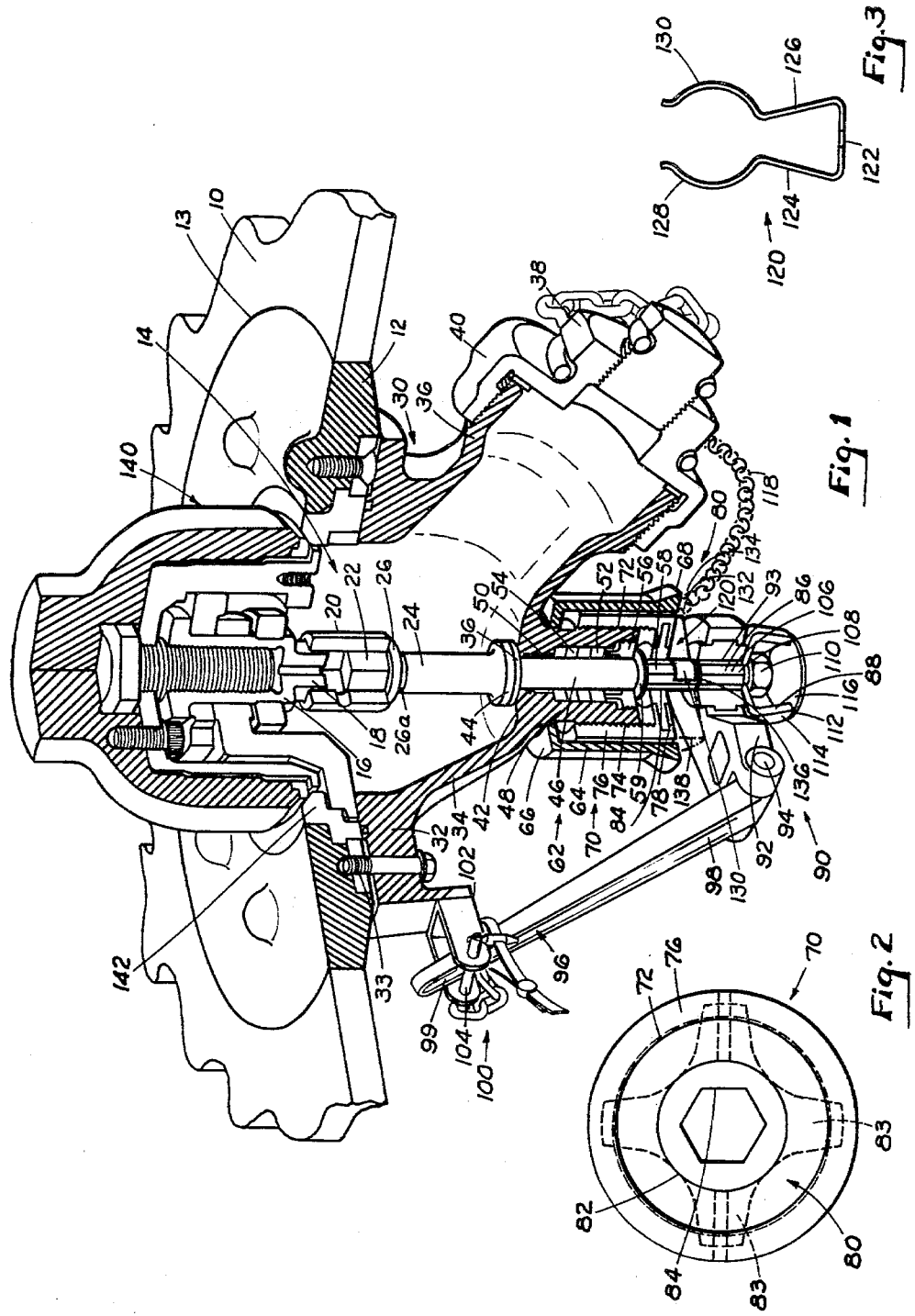

BOTTOM OUTLET VALVE OPEN AND CLOSED INDICATOR

BACKGROUND OF THE INVENTION

U.S. Pat. No. 4,198,032 discloses a bottom operable tank car lading valve. A handle assembly to move the lading valve between open and closed positions is disclosed in U.S. Pat. No. 4,212,447.

However, an operator cannot determine if the valve is open or closed from inspection of the outside of the outlet chamber.

The object of the present invention is to provide an indicator assembly for a bottom operable tank car valve whereby an operator can ascertain if the valve is in the open or closed position by inspection of the indicator assembly.

SUMMARY OF THE INVENTION

In accordance with the present invention an open and closed position indicator assembly is provided for use with a bottom operable tank car valve assembly. An operating shaft for the lading valve extends downwardly through the outlet chamber and includes a connection portion at its lower end. An indicator housing is integrally connected to that portion of the outlet chamber above the connection portion which surrounds the operating shaft. An indicator member located within the indicator housing is internally threaded and engages an externally threaded portion of the outlet chamber. The indicator member includes a lower non-round opening which is adopted to be driven by a cooperating non-round portion of the operating shaft. Rotation of the operating shaft with an operating handle will move the lading valve between open and closed positions and will also move the indicator member downwardly to a position below the indicator housing to a position viewable by the operator when the lading valve is in the open position, and will move the indicator member upwardly to a position within the indicator housing which is not viewable by the operator when the valve is in the closed position. In addition the extent to which the indicator member extends below the indicator housing may be used as a measure of the extent to which the lading valve is moved toward the open position.

The operating shaft includes a connection portion to receive an operating handle. A plate for supporting the operating handle is also provided. The connection portion is hollow and a bolt extends vertically upwardly to hold the operating handle in place on the connection portion. The bolt is threaded into a threaded portion of the operating shaft above the handle connection portion. A shear groove is provided in the hollow portion of the operating shaft above the handle connection portion. If the connection portion of the operating shaft is overtorqued, the operating shaft will shear along the shear groove to protect the valve parts against failure. The bolt prevents the connection portion from dropping off from the operating handle. However rotation of the connection portion by the operating handle will not rotate the operating shaft above the sheared groove, move the indicator member vertically or move the valve between open and closed position after the groove is sheared.

The indicator is preferably made of colored or painted plastic or metal of a color which contrasts with the indicator housing. A metallic insert is provided in the lower portion of the indicator member which defines the non-round opening. Thus if the indicator member becomes stuck, the operating shaft will break at the shear groove, and the lading valve cannot thereafter be opened or closed with the operating handle until the indicator member and the operating shaft are repaired or replaced. The valve can however be opened and closed with a thin tool having a non-round opening.

An optional clip is provided to be inserted when the lading valve is in the closed position and the indicator member is located within the indicator housing. Prior to unloading the clip is removed. The clip cannot be inserted unless the lading valve is in closed position.

An impact shear groove is provided in the upper portion of the operating shaft to prevent damage to the valve or any of its parts in an accident situation.

IN THE DRAWINGS

FIG. 1 is a vertical sectional view of the indicator assembly of the present invention in perspective.

FIG. 2 is a detail view of the indicator member and the indicator member insert utilized in the present invention.

FIG. 3 is a detail plan view of an optional clip which may be utilized in the present invention.

DESCRIPTION OF PREFERRED EMBODIMENTS

In the drawings a railway tank car bottom is illustrated at 10. A mounting flange 12 is welded to the tank bottom at the opening 13. As is disclosed in U.S. Pat. No. 4,198,032, hereby incorporated into the present application by this reference, a tank car lading valve assembly 14 is attached to this mounting flange. Reference may be made to this patent for description of the operation of this lading valve assembly. This lading valve assembly includes a depending operator 16 having a non-round connection portion 18. A non-round connector 20 mechanically joins connection portion 18 with a non-round portion 22 of a lading valve operating shaft 24. Shaft 24 further includes a shoulder 26 which abuts the lower surface of connector 20. An impact shear groove 26a is provided below shoulder 26.

Operating shaft 24 extends downwardly within an outlet chamber indicated generally at 30. Outlet chamber 30 includes a flange portion 32 which is held in place abutting mounting flange 12 by means of fasteners 33 extending through flange portion 32. Outlet chamber 30 includes a body portion 34 which is hollow and includes an unloading spout 36. A threaded cap 38 holds a seal 40 in engagement with the unloading agent in a conventional manner.

Outlet chamber 30 includes a generally horizontal internal surface 42 upon which is placed a thrust washer 36. Operating shaft 24 is provided with a shoulder 44 which rests upon the thrust washer. Operating shaft 24 further includes a circular portion 46 extending downwardly through an operating portion 48 of the outlet chamber. Guides 50 and 52 and a packing 54 are held in place with a threaded cap 56. Operating shaft 24 is further provided with a non-round portion 58 having a groove 59. A snap ring 60 (commercially available) is then inserted with a tool. Ring 60 provides a stop for the lower surface of the cap 56.

In accordance with the present invention, an indicator housing indicated generally at 62 is welded to the operating portion 48 of the outlet chamber. The indicator housing 62 is generally cylindrical and includes a body portion 64 and a top portion 66. Cylindrical body portion 64 is flared at its lower end as indicated at 68. Flared portion 68 directs commodity away from the indicating area. Bottom portion 68 provides protection for an indicator member 70.

Indicator member 70 is internally threaded as indicated at 72 and is adopted to engage external threads 74 provided upon outlet chamber operating portion 48. The threads 72 and 74 are such as to move indicator member 70 downwardly when the lading valve is moved upwardly to the open position. Indicator 70 is generally cylindrical, having a body portion 76 and a bottom or base portion 78. Base portion 78 is provided with an insert indicated at 80 including a cylindrical portion 82 and arms 83 (FIG. 2) extending into base portion 78 and a non-round connection portion slot 84 adapted to be engaged and rotated by non-round operating shaft portion 58.

Operating shaft portion 58 is provided with a connection portion 86 at its lower end. This connection portion includes a plate 88 which provides a surface which supports an operating handle assembly 90 which rotates the operating shaft 24 through engagement with portion 86. The operating handle assembly is described in detail in U.S. Pat. No. 4,212,447, hereby incorporated into the present application by this reference, and reference may be made to this patent for the details of the operating handle. It is sufficient for an understanding of the present invention to point out that this assembly includes a non-round connection portion 92 which rests upon the plate 88. The handle assembly further includes a pin 94 which connects a handle 96 to the connection portion 92. Handle portion 96 is fabricated at its lower end 98. In addition the handle includes an upper end 99 which is held in place within a bracket 100 mounted upon the discharge conduit or tank by welding at 102. The bracket 100 is "U" shaped and includes a removable pin 104 to free the handle 96 to pivot the handle to the horizontal position to rotate the connection portion 86 of operating shaft 24.

In order to hold the support plate 88 in place, an opening 106 is provided in the connection portion 86. A threaded fastener 108 is threaded into the threaded portion 106a of the opening 106. The head of the fastener 110 engages the horizontal portion 112 of a channel 114 supporting plate 88. Once the fastener 106 is threaded in place, a plate 116 is welded to the channel 114 to close off access to the fastener head 110. A chain 118 for the cap 38 is welded to the plate 88.

A clip 120 is generally "U" shaped as shown in FIG. 3, and includes a straight section 122 and a pair of legs 124 and 126 which engage the connection portion of the shaft 46. A pair of arcuate portions 128 and 130 extend outwardly from the legs 124 and 126. A chain 132 extends through an opening 134 in the clip to prevent loss of the clip.

A shear groove 136 is provided in connection portion 88 above handle connection portion 92 to prevent overtorquing of the operating shaft during opening and closing of the valve.

In operation the indicator assembly of the present invention is shown with the lading valve closed and the indicator member 70 located within the indicator housing 62 in FIG. 1. If the lading valve were to be opened for the purpose of unloading the lading, cap 38 is first removed and a discharge conduit connected to the threaded portion of the discharge spout 36. Next the clip 120 is removed. The handle 96 is removed from the stored position shown in FIG. 1 by removing the pin 104, to a horizontal position to operate the operating shaft 24. Rotation of the handle 96 causes rotation of the operating shaft 24 through engagement of non-round portion 92 with non-round portion 86 of the operating shaft. This will then move the valve 140 upwardly off its seat 142 toward open position. At the same time, the non-round shaft portion 58 will engage the non-round slot 84 in the indicator and move the indicator downwardly relative to the indicator housing 64. The indicator member will thus begin to appear below the flared portion 68 of the housing. Continued rotation of the operating shaft 24 by the handle 96 will result in movement of the lading valve to the full open position and movement of the indicator member 70 to the full open position. The full open position of the indicator member is shown in dotted lines 138 in FIG. 1. The indicator member is either painted or formed of a color which contrasts with the color of the housing 62, so that the open position of the valve is clearly visible to the operator. It also should be noted that a partially open position of the valve will be indicated by an intermediate position of the indicator between the full open position 138 and the closed position within the housing.

The metallic insert 82 preferably made of steel is provided to insure that if the indicator is not working, that the shaft will shear along the groove 136 provided in operating handle portion rather than have the indicator stuck in one position and not properly indicate the open or closed position of the valve. The insert is conveniently molded into the indicator member in a molding press according to conventional techniques. The indicator member 70 is thus conveniently made of colored plastic for example. The housing 62 is preferably made of metal to protect the indicator member. Since the fastener 108 holds the support plate 88 and the handle connection portion 92 in place upon shaft portion 58 shearing along the groove 136 due to overtorquing will not result in the handle assembly 90 dropping off. However rotation of the operating shaft after shearing by the handle 96 will simply cause the handle connection portion 92 and the sheared shaft portion to spin since they no longer are in engagement with the upper portion of the operating shaft 24.

When the indicator member has been returned to the closed position within the housing 62, it is preferred to insert the clip 120 between the bottom of the indicator member and the handle 92. This is particularly desirable for movement in transit. At the unloading site, the clip 120 is removed and the unloading process repeated.

If the operating shaft becomes sheared off along the groove 136, and the handle 96 is moved to the horizontal position, it is possible to insert a relatively thin operating tool having a non-round opening and move the valve between open and closed position on a temporary basis. The operating tool however must be sufficiently thin that when the indicator is in the full open position 138 it does not abut the tool. It will be apparent that the thickness of this tool may provide some limitation on the extent to which the valve can be moved into open position after the shearing has taken place.

In the event of hard impact to the indicator housing 62 or the outlet chamber 30, the operating shaft will tend to shear along the shear groove 26a and the fasteners 34 will also shear and the outlet chamber will drop off.

In order to install a new operating shaft the following procedure is followed. With or without the lading removed from the tank, the outlet chamber is removed by removing the bolts 33. The operating shaft 24 and its connection portion 22 drop out of the connector 20 with the outlet chamber.

Plate 116 is removed from cup or channel 114. Bolt 108 is unthreaded and removed from shaft portion 58. This frees channel 114 and operating handle 92. If not already done, clip 120 is then removed. Indicator 70 is then unscrewed. Snap ring 60 is removed with a suitable tool. At this point shaft 46 may be pulled vertically out of outlet chamber operating portion 48.

A new shaft is installed by inserting the shaft into the operating portion 48 with the packing gland 54, guides 50 and 52 in place, and cap 56 in place. Snap ring 60 is then inserted into groove 59 of the shaft with a suitable tool. Indicator 70 is then threaded onto threaded portion 74.

Bolt 108 is then threaded into handle portion 58 to support plate 88 and handle connection 92. Plate 116 is then welded in place. Clip 120 is then installed. The outlet chamber is then reattached to flange portion 12 with fasteners 33. In this operation, shaft portion 22 is inserted into connector 20 with shoulder 26 abutting connector 20. The outlet chamber is then again ready for use.

What is claimed is:

1. An open and closed position indicator assembly for use with a bottom operable tank car valve assembly comprising: an operating shaft for a lading valve extending downwardly through a tank car outlet chamber and including a lower connection portion at its lower end; an indicator housing integrally connected to that portion of the outlet chamber above said connection portion which surrounds said operating shaft; an indicator member located within said indicator housing having internal threads which engage an externally threaded portion of the outlet chamber; said threads providing for downward movement of said indicating member when the lading valve is moved toward the open position; said indicator member including a lower non-round opening which is adopted to be driven by a cooperating non-round portion of the operating shaft; whereby rotation of the operating shaft with an operating handle engaging said lower connection portion will move the lading valve between open and closed positions and will also move the indicator member downwardly to a position below the indicator housing to a position viewable by the operator when the lading valve is in the open position, and will move the indicator member upwardly to a position within the indicator housing which is not viewable by the operator when the valve is in closed position.

2. An indicator assembly according to claim 1, wherein the extent to which the indicator member extends below the indicator housing indicates the extent to which the lading valve is moved into open position.

3. An indicator assembly according to claim 2, wherein indicator is a member made of colored or painted plastic or metal of a color which contrasts with the indicator housing.

4. An indicator assembly according to claim 2, wherein an indicator clip is provided to be inserted between said handle connection portion and said indicator housing when the lading valve is in closed position and the indicator member is located within the indicator housing, and whereby the clip cannot be inserted unless the lading valve is in the closed position, and whereby said clip blocks downward movement of said indicator.

5. An indicator assembly according to claim 1, wherein said operating shaft lower connection portion includes a plate to support said operating handle.

6. An indicator assembly according to claim 5, wherein said lower connection portion is hollow and a bolt extends vertically upwardly to hold said plate in place on the connection portion.

7. An indicator assembly according to claim 6, wherein said bolt is threaded into a threaded portion of the operating shaft above the handle connection portion.

8. An indicator assembly according to claim 6, wherein a shear groove is provided in said hollow portion of the operating shaft above the handle connection portion whereby if the lower connection portion of the operating shaft is being overtorqued, the operating shaft will shear along the shear groove, and whereby said bolt prevents the lower connection portion from dropping off from the operating handle, and whereby rotation of the connection portion by the operating handle will not rotate the operating shaft above the sheared groove, move the indicator member vertically, or move the valve between open and closed position after the groove is sheared.

9. An indicator assembly according to claim 8, wherein a metallic insert is provided in the lower portion of the indicator member which defines said indicator non-round opening, whereby if said indicator member becomes stuck, the operating shaft will break at said shear groove.

10. An indicator assembly according to claim 8, wherein said operating shaft includes a second shear groove in the upper portion of the operating shaft, and wherein said outlet chamber is held in place with shearable fasteners, and wherein upon hard impact to said outlet chamber and/or said indicator housing said operating shaft will shear along at least one of said first and second shear grooves.

11. An indicator assembly according to claim 10, wherein upon hard impact to said outlet chamber and/or said indicator housing said fasteners will shear and said outlet chamber will drop leaving the lading valve in closed seated position.

12. An indicator assembly according to claim 4, wherein said clip is generally "U" shaped.

* * * * *

UNITED STATES PATENT AND TRADEMARK OFFICE
CERTIFICATE OF CORRECTION

PATENT NO. : 4,327,768
DATED : May 4, 1982
INVENTOR(S) : Gunter R. Behle

It is certified that error appears in the above-identified patent and that said Letters Patent are hereby corrected as shown below:

In column 2, line 51, please change "agent" to --spout--.

Signed and Sealed this

Second Day of November 1982

[SEAL]

Attest:

GERALD J. MOSSINGHOFF

*Attesting Officer*  *Commissioner of Patents and Trademarks*